United States Patent
Monti et al.

(10) Patent No.: US 11,878,250 B2
(45) Date of Patent: Jan. 23, 2024

(54) CONTENT ENHANCEMENT SYSTEM AND METHOD

(71) Applicant: Sony Interactive Entertainment Inc., Tokyo (JP)

(72) Inventors: Maria Chiara Monti, London (GB); Fabio Cappello, London (GB); Matthew Sanders, Hertfordshire (GB); Timothy Bradley, London (GB); Oliver Hume, London (GB); Jason Craig Millson, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/408,687

(22) Filed: Aug. 23, 2021

(65) Prior Publication Data
US 2022/0062771 A1    Mar. 3, 2022

(30) Foreign Application Priority Data

Aug. 28, 2020  (GB) ...................................... 2013531
Sep. 18, 2020  (GB) ...................................... 2014734

(51) Int. Cl.
*A63F 13/63*  (2014.01)
*A63F 13/215*  (2014.01)
(Continued)

(52) U.S. Cl.
CPC ............ *A63F 13/63* (2014.09); *A63F 13/213* (2014.09); *A63F 13/215* (2014.09); *A63F 13/424* (2014.09); *A63F 13/537* (2014.09); *A63F 13/5372* (2014.09); *A63F 13/5378* (2014.09); *A63F 13/86* (2014.09); *A63F 13/87* (2014.09); *G06F 40/20* (2020.01)

(58) Field of Classification Search
CPC ...... A63F 13/63; A63F 13/213; A63F 13/215; A63F 13/537; A63F 13/5372; A63F 13/5378; A63F 13/86; A63F 13/87
See application file for complete search history.

(56) References Cited

U.S. PATENT DOCUMENTS 9,968,856 B1    5/2018  Ninoles
10,300,394 B1 *  5/2019  Evans ..................... A63F 13/86
(Continued)

OTHER PUBLICATIONS

Extended European Search Report for corresponding EP Application No. 21192127.5, 8 pages, dated Jan. 24, 2022.
(Continued)

*Primary Examiner* — Dmitry Suhol
*Assistant Examiner* — Carl V Larsen
(74) *Attorney, Agent, or Firm* — Matthew B. Dernier, Esq.

(57) ABSTRACT

A content modification system comprising a content receiving unit operable to receive content comprising a virtual environment and one or more active elements, an input receiving unit operable to receive inputs from one or more users, an element addition unit operable to generate one or more virtual elements within the virtual environment in response to the received inputs, the virtual elements being unable to be interacted with by the one or more active elements, and a content generation unit operable to generate modified content comprising the virtual environment, the one or more active elements, and the one or more generated virtual elements.

13 Claims, 4 Drawing Sheets

(51) Int. Cl.
*A63F 13/86* (2014.01)
*A63F 13/213* (2014.01)
*A63F 13/5372* (2014.01)
*A63F 13/5378* (2014.01)
*A63F 13/537* (2014.01)
*A63F 13/87* (2014.01)
*A63F 13/424* (2014.01)
*G06F 40/20* (2020.01)

(56) References Cited

U.S. PATENT DOCUMENTS

| | | | | |
|---|---|---|---|---|
| 10,617,945 | B1* | 4/2020 | George | G06F 3/0481 |
| 11,058,955 | B2* | 7/2021 | Chan | A63F 13/58 |
| 2003/0038805 | A1 | 2/2003 | Wong | |
| 2006/0058103 | A1* | 3/2006 | Danieli | A63F 13/87 |
| | | | | 463/42 |
| 2006/0200662 | A1* | 9/2006 | Fulton | A63F 13/5375 |
| | | | | 713/164 |
| 2008/0081701 | A1* | 4/2008 | Shuster | A63F 13/63 |
| | | | | 463/42 |
| 2014/0031121 | A1* | 1/2014 | Kern | A63F 13/497 |
| | | | | 463/31 |
| 2015/0331813 | A1* | 11/2015 | Perrin | H04N 21/4126 |
| | | | | 345/522 |
| 2016/0250553 | A1* | 9/2016 | Ikenaga | A63F 13/803 |
| | | | | 463/31 |
| 2017/0011554 | A1* | 1/2017 | Burba | G06T 15/20 |
| 2019/0105568 | A1 | 4/2019 | Platt | |
| 2019/0118086 | A1* | 4/2019 | Gentile | A63F 13/25 |
| 2019/0370492 | A1* | 12/2019 | Falchuk | H04W 12/033 |
| 2020/0230503 | A1* | 7/2020 | Smithers | A63F 13/86 |
| 2021/0299575 | A1* | 9/2021 | Stafford | A63F 13/497 |
| 2021/0394073 | A1* | 12/2021 | Osman | A63F 13/87 |

OTHER PUBLICATIONS

Combined Search and Examination Report for corresponding GB Application No. 2014734.4, 6 pages, dated Mar. 11, 2021.
Combined Search Report and Abbreviated Examination Report for corresponding GB Application No. 2013531.5, 5 pages, dated Jan. 20, 2021.

* cited by examiner

CONTENT ENHANCEMENT SYSTEM AND METHOD

BACKGROUND OF THE INVENTION

Field of the Invention

This disclosure relates to a content enhancement system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years there has been a significant increase in the popularity of 'e-sports' amongst both competitors and spectators. E-sports, or electronic sports, generally include computer games that are played competitively between two or more players or teams, and these games may be streamed live to an audience via television or an online portal (such as a video streaming website). In some cases, a player of the game streams their own point of view such that spectators can have an insight into an individual player's experience, while in others a commentator may be provided to give an overview of the entire game in a manner analogous to traditional sports broadcasting.

In many cases, viewers are able to interact with one another during the game via an associated chat room or the like which enables text to be sent and received by each viewer. This can improve viewer enjoyment of the content, due to the increased engagement, as well as enable a deeper appreciation of the game through game analysis, tactical discussion, and player appreciation and the like.

In some arrangements, viewers are able to select from different viewpoints when spectating a game that is being played. For example, a viewer may be able to focus on a particular player (or player character), a particular objective, or a static/dynamic view of one or more portions of the in-game environment. In such cases, the chat feature described above may be advantageous in that it can be used to alert users to particular hotspots for action—this can lead to an improved user viewing experience, as it reduces the likelihood of them missing the action.

Alternatively, or in addition, the spectated content may be supplied with a commentator as in real-world sports broadcasts. The commentator (or commentators) is considered advantageous as they are able to offer a guided viewing experience, and to provide additional information, analysis, and/or reaction to the events that occur within the content. It is common practice for a commentary team to include a first commentator with specialised knowledge and insight to provide information about what is happening within, and a second commentator (a 'flavour' or 'colour' commentator, often a former player) to increase viewer engagement.

It is therefore apparent that there is a desire within the field of spectator sports for increased engagement and improved viewing experiences. It is in this context that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
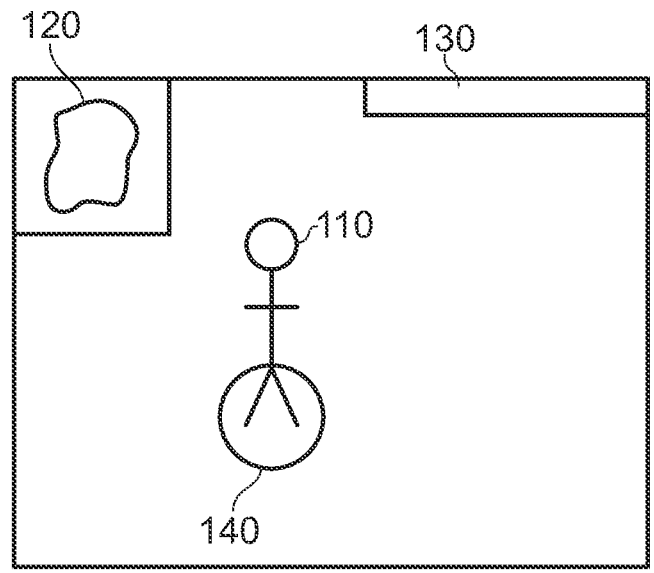
FIG. 1 schematically illustrates a modified scene from a video game.

Referring now to the drawings, wherein like reference numerals designate identical or corresponding parts throughout the several views, embodiments of the present disclosure are described.

In traditional video game spectating arrangements, viewers are presented with a video stream that shows the events of a game from an automated or operator-controlled virtual camera angle. Commentators often provide a live voiceover describing the events that are shown, as well as providing additional spoken insight, but with little other ability to generate an informative and immersive experience for spectators. This may be addressed, at least in part, in post-game proceedings in which marked-up replays may be shown. These marked-up replays may have lines or circles drawn over the displayed video stream in order to highlight particular elements of the game, for example, to assist the commentator in identifying and explaining the events that took place.

The video stream is often hosted by a website or other video service which is operable to broadcast a video stream to any number of viewers. The video stream may be accompanied by any other functionality as appropriate; for instance, chat windows and the like may enable spectators to interact with one another and express their opinions on the events that occur within the video stream. Additional platforms, such as social media, may also be used by spectators to comment on the events and these comments may be incorporated into the video stream as appropriate.

However, as discussed above such arrangements are rather limited in scope for the commentator to provide a useful and engaging experience for users.

In embodiments of the present disclosure, enhanced methods of interaction between the commentator (or each of a number of commentators) and the game content is provided. Such methods are considered advantageous as they enable an interaction with the game content itself, rather than a video of that content. This greatly increases the range of communications available to a commentator in terms of both of format and presentation, and increases the flexibility with which such communications can be received. In some instances, this may enable a less rigid or even non-linear commentary experience to be provided which may increase the ability of users to interact with and interpret the content.

The advantages of these improved interactions may be appreciated in traditional streaming arrangements, in which a spectator is presented with a video stream, by virtue of improved visual elements that are able to be viewed for instance. However, in some embodiments it may be considered appropriate to provide a more interactive viewing experience in which a viewer is able to spectate content via interactions with the virtual environment itself. For instance, this may comprise the allowing of spectators to join a game in a spectator mode (limiting their ability to interact with the virtual environment), or the generation of a parallel virtual environment in which the spectator can view the game. This more interactive approach can be implemented in any suitable fashion, with the intention being that the spectator is able to have a presence within the virtual environment (for instance, based upon their viewpoint location or the location of a spectator avatar) and/or is able to interact with one or more of the virtual elements via inputs. It should therefore be understood that references to a spectator stream below should not be considered limited to only those embodiments in which a video is provided to a viewer in a traditional manner.

FIG. 1 schematically illustrates a scene 100 from a video game in which a visible element is added by a commentator. In this particular example, the element 140 is incorporated into the game by a commentator so as to highlight a particular in-game character 110. The scene 100 also comprises a mini-map 120 (providing additional information about the virtual environment, such as the location of characters, terrain, and areas of significance) and a scoreboard area or other GUI element 130.

The element 140 is generated as a part of the game, such that it may be associated with the character 110 directly rather than being an overlaid element that is drawn (or otherwise rendered) at a location corresponding to the character 110. This may be advantageous in that improved tracking of the character 110 by the element 140 can be enabled, and the appearance of the element 140 within the scene may be more natural as it is rendered as a part of the image rather than simply being overlaid.

This improved display of the element 140 may also enable more complex elements to be generated, thereby improving the range of information that may be reliably communicated by the element 140. The use of elements that exist within the virtual environment may also enable the elements to be revisited at a later time more easily, and in a more flexible manner (for example, to enable spectators to view the elements at their own pace). In some embodiments, these elements are presented to a spectator in conjunction with an audio commentary (akin to a traditional sports commentary or the like), while in other embodiments this audio commentary may not be provided; this may be particularly suited to arrangements in which the spectator desires exploration of the virtual environment and the events within at their own pace.

Figure 2:
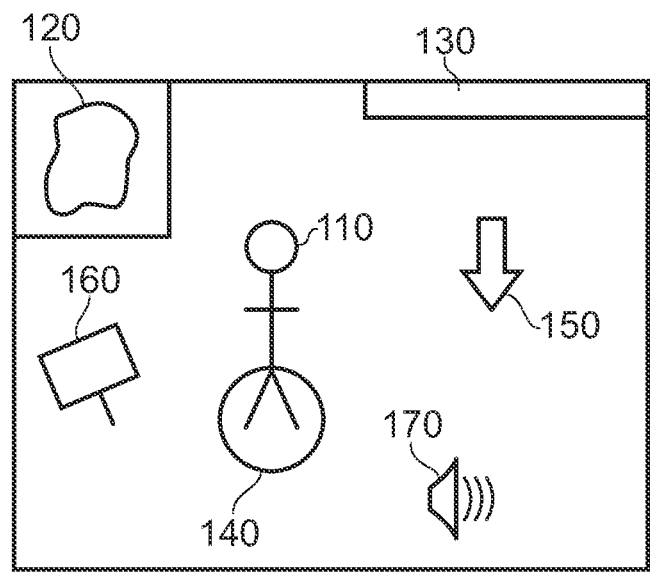
FIG. 2 schematically illustrates a scene from a video game comprising one or more additional/alternative modifications.

Of course, the example of FIG. 1 in which a circular element 140 is provided that is associated with a character 110 should not be considered to be limiting. Any suitable element may be provided as appropriate within a given context; any suitable shape, colour, or size may be considered with the goal of drawing attention to (or highlighting a particular feature of) the character. Similarly, the element should not be limited so as to only be able to be associated with characters—elements may be associated with any suitable object within an environment, or even a location in the virtual environment in which no character or object is present. FIG. 2 schematically illustrates a range of different exemplary elements that may be used to represent content provided by a commentator.

A first exemplary element is the arrow 150. This is an example of an element that is used to draw attention to a specific part of the virtual environment; for example, a specific object or location. The size, colour, texture, and/or style of the arrow 150 may be varied as appropriate to indicate one or more properties of the specific part of the virtual environment that is being indicated—for instance, the colour may be indicative of the importance of the part, while the style could indicate the nature of the part (such as object/location). Alternatively, or in addition, display properties of the arrow 150 (or indeed any element) may be selected in dependence upon the virtual environment—for example, to blend in with or to stand out from the environment as appropriate.

A second exemplary element is the signpost 160. This may be used in a similar fashion to the arrow 150 (that is, to indicate a point or object of interest) in a number of embodiments. Alternatively, or in addition, this element 160 may be used to convey information to the user directly; examples of such a feature include the display of an image and/or text on the signpost 160.

Another exemplary element shown in this Figure is that of the speaker element 170. This element 170 is expected to be indicative of an available audio content that can be played back by the user; for instance, commentary relating to the location of the icon 170 or an event that has occurred at that location at another time. Corresponding (or other less specific, such as an exclamation mark to indicate content more generally) elements may be used for any suitable content such as audio, video (such as a video camera icon), or image (such as a camera icon) content as appropriate.

As noted above, these elements may be generated as a part of the in-game environment rather than as overlaid visual elements. This gives them a virtual location and the possibility of interaction with other virtual elements that share the virtual environment as well as players/spectators that are viewing the virtual environment or otherwise interacting with it. The use of a location for the element within the virtual environment (rather than as a displayed overlay) may be advantageous in that the element may be viewed correctly from a range of different angles without causing erroneous display of the element—no matter the spectator's perspective, the display of the element will be adjusted accordingly as it forms a part of the virtual environment.

Figure 3:
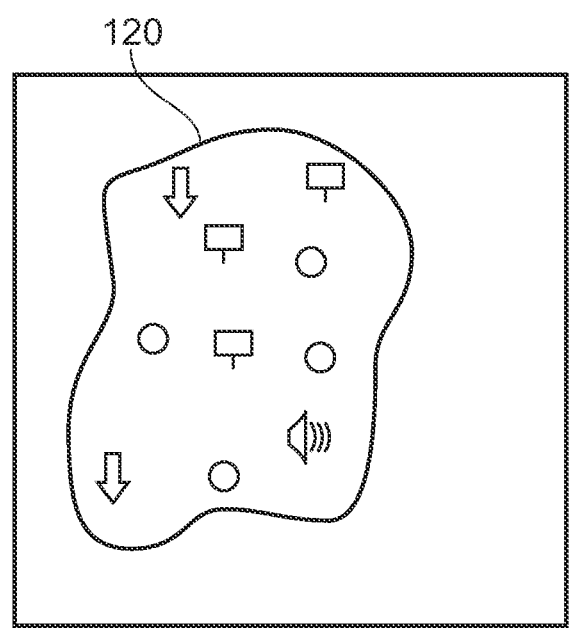
FIG. 3 schematically illustrates an enlarged view of a mini-map.

Given that the elements described above are formed as a part of the in-game virtual environment, it is considered that their presence may extend beyond display on the screen at a particular location. For instance, the elements may be considered objects in their own right and one or more interactions may be considered possible within the virtual environment. FIG. 3 schematically illustrates an enlarged map element corresponding to that indicated by reference 120 in FIGS. 1 and 2.

The mini-map 120 shows representative icons identifying the locations of one or more elements (such as those shown in FIG. 2) and/or other objects within the virtual environment such as terrain and player-controlled characters. This can enable the elements to be located more easily, as well as assisting a user in identifying the location of the elements within the virtual environment so as to add context to the information that the elements convey.

As noted above, the elements may comprise any suitable information or links to information as appropriate. A selection of examples of such information are described below; these examples are not intended to be limiting, as similar principles may be applied to provide any other suitable content in an appropriate manner. The elements may comprise any combination of different types of information as appropriate; for example, images and text may be provided using the same element.

A first example is that of text being provided to a user via an element placed within the virtual environment. This may include any suitable information; one envisaged use case is that of provided a description and insight into an event that occurred at the location of the element. The text may also include one or more hyperlinks for directing a user to other content or further text. Hyperlinks may also be provided to websites, chatrooms, group (such as gaming guilds or clans) pages, or any other suitable external content.

Another example is that of image content being provided via an element; for instance, a screenshot of an earlier event or a relevant in-game element may be provided. This image content may be provided directly (such as being displayed on a signpost as described above, which may be prompted by a user input where considered appropriate), or may be provided after some form of interaction by a user that acts as a request for the display of the information separate to the element. For example, interacting with the element may generate an overlay within the virtual environment (or separate to the environment, in some embodiments) which includes the image content.

Audio content may also be provided in a similar fashion; audio may begin to auto-play within the virtual environment when the user approaches the element. Alternatively, or in addition, playback of the audio may be triggered by a user input or interaction within the environment. Examples of suitable audio content include a description of events that have occurred within the virtual environment (including analysis of those events, in some cases), descriptions of objects, or of the environment itself. In some instances, this audio content is generated by a commentator on a game to provide information to one or more spectators of that game.

In some embodiments, video content may also (or instead) be provided via one or more virtual elements. Such content may be provided in a similar fashion to the image content as described above. The video content may comprise associated audio, where desirable. Video content may include commentary or other discussion of the virtual environment or events within the virtual environment (for example), as this may be seen as a more immersive and/or user-friendly way to communicate information compared to text.

The example of hyperlinks described above may be extended in any suitable fashion, rather than simply being limited to a text-based link that is provided to a user. For example, a user may be able to interact with an element that acts as a link to other content or resources itself. Here 'interaction' may include an explicit activation via user input, or may instead include a user satisfying one or more conditions (such as proximity) to cause the element to be activated; of course, interactions could be envisaged which comprise elements of both of these options. In some embodiments the link is not to external content, but instead modifies one or more parameters within the virtual environment. For example, activation of the link may change which elements are displayed (such as selecting a particular commentator or level of detail) or vary how they are displayed.

Further examples of content that may be linked include one or more external videos, additional spectator content, game-specific content, and files for download.

External videos may include highlights or guides relating to the virtual environment or a specific game or match; these may be hosted by a third party, or any suitable service. External here is used to indicate that the video is not shown within the virtual environment, and not necessarily that the content is hosted outside of the game software (or an equivalent). That is to say that a separate video player within the software showing the virtual environment may be used to display the video content.

Additional spectator content may refer to a number of different types of content. In some examples, this may be alternative or additional spectator streams (rather than other highlights) that may be relevant to a spectator's interests; one instance in which this may be applicable is when a player is viewing older content, and a link to live content may be provided. Alternatively, or in addition, links to alternative views or commentators may be provided, along with additional in-game statistics or the like.

Game-specific content may include links to information about the game (or virtual environment) itself. For instance, links may be provided to character information and statistics (such as ability trees and win rates). Links to game rules in a written or image-based format may also be provided, or any other information that may aid a user's understanding of specific features of a game (and therefore understanding of the events that occur).

Additional files for download may be determined as desired in the context of the given implementation. One example may be that of calendar information or the like for future streams (player- or team-specific, in some cases), learn-to-play guides, patch notes, and/or post-game summaries or match reports.

Of course, in some cases simple examples with no additional information (such as highlighting/pointing examples) are able to convey enough information so as to preclude the need to provide additional information in the element. This may be particularly true in embodiments in which a commentary voice over is provided, as the highlighting may simply emphasise or clarify parts of the spoken description.

As has been discussed, the elements described above are formed as a part of the virtual environment (as opposed to being a visual overlay). This may lead to embodiments in which the players themselves are able to view the elements, if desired. This may be appropriate in some contexts, as this may act as a feedback mechanism to encourage particular behaviours or inform the players for example. However, in some cases this may not be desirable. In such cases, it may be determined that all of the elements (or at least a subset of the elements) should be made invisible to the players. Visibility may also be varied for different spectators or groups of spectators in some examples. For instance, spectators may be grouped by experience level and only shown elements directed towards that particular experience level; any other division of spectators may be considered appropriate, including a subscription level, language, preferred characters/players/teams, and/or location. In some arrangements, it may be considered that the properties of each element may be adapted on an individual basis.

Figure 4:
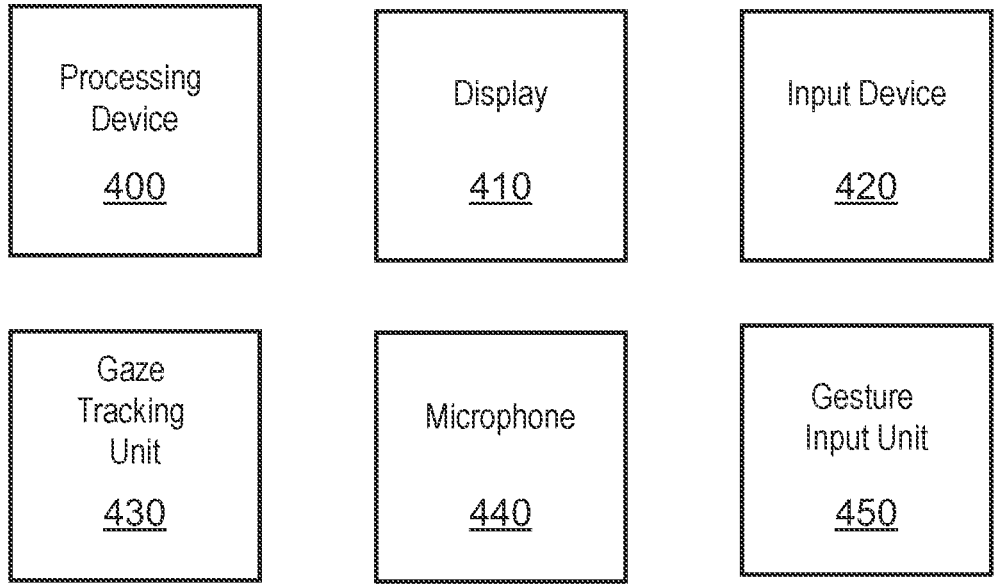
FIG. 4 schematically illustrates an input arrangement for use in generating elements for display within the virtual environment.

FIG. 4 schematically illustrates an input arrangement for use in generating elements for display within the virtual environment. Such an arrangement may be operated by the commentator or by another person involved in the guiding of a spectator experience in a virtual environment. In some embodiments the elements may be generated on the fly so as to enable a real-time display of the elements during the spectator stream. Alternatively, or in addition, elements may be generated after the event so as to enable spectators to view the spectator stream and the generated elements in a non-live manner after the conclusion of the event (or at least with a substantial delay). For instance, the broadcast of the spectator stream may be delayed by five minutes, ten minutes, or an hour (or any amount of time deemed appropriate) so as to provide ample time to generate the elements.

The processing device 400 is configures to present images of the virtual environment on the display 410, and to receive inputs from each of the units described below. In some embodiments, the processing device 400 is configured to run a simulation of the virtual environment locally while in others the virtual environment may be simulated by a remote server (for example, in a cloud computing or multiplayer gaming arrangement). In some embodiments the display may be a head mountable display unit, while in other embodiments the content may instead (or additionally be shown) on one or more other display devices such as televisions and computer monitors.

The input device 420 may represent one or more of a mouse, keyboard, gamepad, or any other device for receiving physical inputs from a user. This may enable the user to navigate the environment (or a video of the environment) as well as generate elements, and provide inputs to customise the elements (such as modifying the appearance of the element or adding text/links/other content).

The gaze tracking unit 430 is operable to track the gaze of the operator. This may be performed using any suitable arrangement; one example is that of using infra-red light sources and cameras to illuminate and capture images of one or both of the operator's eyes. The gaze tracking unit 430 should be operable so as to be able to identify a location of the screen upon which the operator is focused, and in some cases identify a particular object or region within the virtual environment itself upon which the operator is focused.

The microphone 440 is operable to capture one or more audio inputs from the operator. These inputs may include spoken words or other audio gestures, such as a clicking of the fingers. The inputs may be used in some cases to generate an audio stream to accompany the spectator stream, for instance as a commentary track. Alternatively, or in addition, the inputs may be used to generate or supplement elements that are placed within the virtual environment; for instance, voice commands may be used to select and/or place one or more of the elements, or inputs may be used to generate audio to be associated with one or more of the elements. Element generation based upon an audio input may be reliant upon particular keywords (such as element names), or it may be entirely contextual such that no dedicated input is required for element generation (such as identifying the subject of a discussion and highlighting this with an appropriate element). In some embodiments, a speech-to-text process may be performed upon the captured inputs.

The gesture input unit 450 is operable to capture one or more gesture inputs from the operator. These gesture inputs may be used in any suitable manner, such as for controlling element placement and generation or controlling of a camera angle or the like. The gestures may be captured using a camera that is configured to capture images of the operator, or using one or more hardware motion detectors such as gyroscopes or accelerometers to identify motion.

Inputs from any of these units (alone or in combination) may be used to select, place, or otherwise generate and modify elements for the spectator stream in an effective manner. For instance, in some cases it may be considered advantageous that an operator is able to identify the location of an element to be provided using a gaze direction, and to generate an element based upon a speech input. This enables a hands-free operation by the operator, which can enable improved camera or viewpoint manipulation and the like.

While generally embodiments in which the operator is able to interact directly with the virtual environment are discussed in this disclosure, this should not be considered to be limiting. In some embodiments, it is considered that the operator is presented with a spectator stream in the form of a video rather than via a direct access to the virtual environment (or a replica thereof).

In such embodiments, the one or more inputs described above may still be provided as appropriate. However, rather than directly modifying or interacting with the virtual environment to generate elements, the operators inputs relating to the video are used to generate the elements in an indirect fashion. This may include transmitting point of focus information to a server that is hosting the virtual environment, for example, which may be configured to identify objects or locations within the virtual environment so as to enable the generation of elements at a specified location. In some cases it may be possible to identify a depth within an image based upon the captured gaze information, while in others it may be advantageous to determine a line of sight and then select an object that intersects that line of sight of the operator.

In some embodiments, it is considered that multiple operators are able to generate elements in an independent fashion. For example, multiple commentators may provide commentary together. Alternatively, or in addition, other operators may assist a commentator by generating one or more elements on their behalf or to draw their attention to something that should be discussed. It is also considered that multiple commentators are able to commentate on the virtual environment separately, for example so as to target different audiences (such as groups of casual/experienced users, or users speaking different languages).

In such cases, the elements generated by each of the operators may be associated with that operator so as to enable the selective display of those elements. For instance, an attribute associated with the element may identify the operator that generated the element; this may be in a direct fashion (with an attribute such as 'creator'), or in an indirect fashion such as assigned each operator a separate element colour or the like. This can enable spectators to subscribe to particular commentators so as to view the elements they generate, or an appropriate set of elements for display may be selected based upon the audio that is being received by a spectator for example.

Similarly, elements may include an attribute (or otherwise be grouped, such as by element type or element colour) to enable the selective display of groups of elements. For instance, a spectator that does not wish to read may prefer to prevent the display of elements comprising text information. Such a feature can enable a customisation of the spectator experience on a per-spectator basis, which is not available in traditional spectator streams.

One such grouping that may be considered to be particularly useful is that of different levels of complexity. This can enable spectators that are less experienced in a game that is being viewed to only access content of an appropriate complexity; this may lead to more in-depth strategic discussion being reserved for more knowledgeable players, for instance, and varying levels of assumed knowledge in the discussions. This may be particularly useful given the growth in popularity of e-sports as discussed above, as this may lead to a number of newer viewers who may be entirely unfamiliar with the games being played and therefore requiring description of basic aspects that existing players would otherwise know.

Figure 5:
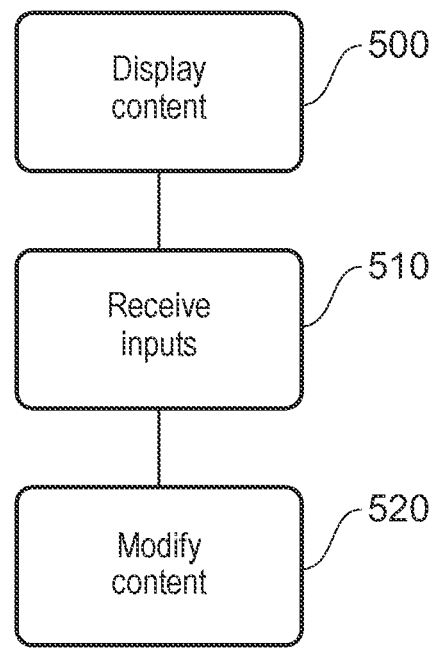
FIG. 5 schematically illustrates an exemplary content generation method.

FIG. 5 schematically illustrates an exemplary implementation method according to embodiments as described above. While this example focuses on an embodiment in which a commentator is viewing a video stream (rather than interacting with a virtual environment directly), this should not be regarded as being limiting.

At a step 500, content is displayed; this content comprises a video stream of a virtual environment in which one or more player-controlled elements are present. For instance, this may be a spectator stream of an e-sports event in which players are competing in a multiplayer game.

At a step 510, inputs are received from the commentator; these inputs comprise gaze tracking and audio inputs. The gaze tracking is used to identify the location of the commentator's gaze in screen coordinates, which are then used to identify an object or location within the virtual environment as appropriate. This may be performed by casting the gaze direction into the virtual environment until an object is met (or another criterion is satisfied), for example. The audio input may be used to provide an accompanying audio stream, to generate audio to be associated with the element, or both.

At a step 520, the content is modified so as to display the generated elements. These elements are generated within the in-game environment, or a replica of that environment supplied to spectators, so as to be viewable by one or more spectators.

Figure 6:
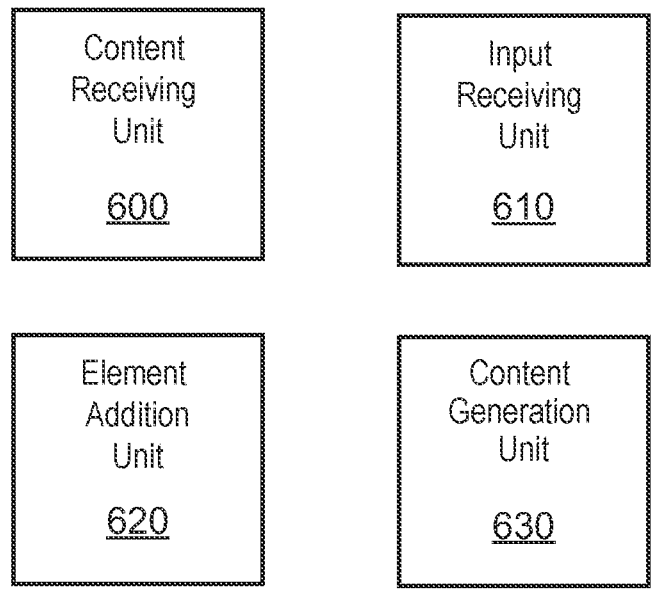
FIG. 6 schematically illustrates a content modification system.

FIG. 6 schematically illustrates a content modification system in accordance with a number of the embodiments described above. The system comprises a content receiving unit 600, an input receiving unit 610, an element addition unit 620, and a content generation unit 630. These units may be provided in a distributed manner, or located at a single processing device such as a computer or server as appropriate.

The content receiving unit 600 is operable to receive content comprising a virtual environment and one or more active elements. This content may be in the form of a video stream, for example, an interactive model of the virtual environment, or information enabling the generation of a corresponding virtual environment and the active elements. Alternatively, or in addition, the receiving of the content may include the accessing of a virtual environment hosted on a server or the like. Of course, any other suitable method of obtaining content may be considered appropriate; for instance, in some cases a local copy of the virtual environment may be maintained which is updated with information about object motion and the like.

As discussed above, in a number of embodiments the virtual environment is a video game environment; however in some cases the virtual environment may instead be a virtual representation of a real-world sports event or the like, or indeed any suitable spectator content. The active elements may be player-controlled elements in video game embodiments, or may be real players or the like in spectator streams that do not correspond to video games.

The input receiving unit 610 is operable to receive inputs from one or more users. The input receiving unit 610 may be operable to receive inputs in the form of one or more of button presses, captured audio, gestures, and gaze tracking in any suitable combination as appropriate; examples of this feature are discussed above with reference to FIG. 4. In the context of video game arrangements, it is considered that the users are non-player users; for instance, commentators that are commentating on the game.

The element addition unit 620 is operable to generate one or more virtual elements within the virtual environment in response to the received inputs, the virtual elements being unable to be interacted with by the one or more active elements. The element addition unit 620 may be operable to select each of one or more of a location, format, and visibility of each element in dependence upon the received inputs. The location of the element may correspond to a location in the coordinate system of the virtual environment. The format of the element may include any aspect of the display of the element, including shape, appearance, and/or functionality. The visibility of each element may relate to the size of elements, or particular subsets of spectators (or players) that are able to view the elements.

In some embodiments, the element addition unit 620 is operable to determine content associated with each element in dependence upon the received inputs. This is discussed above with reference to FIG. 2; it is considered that the content associated with each element (if any) may include audio, image, text, link, and/or video content.

In some embodiments, the element addition unit 620 is operable to generate elements enabling the identification of the user that provided the corresponding inputs. This may include the addition of an attribute to the element that directly identifies the creator, or may use a more indirect identification method. An example of a more indirect identification method is that of using a signature format or colour of element that corresponds to a particular user.

The content generation unit 630 is operable to generate modified content comprising the virtual environment, the one or more active elements, and the one or more generated virtual elements. This modified content may be in the form of a modified spectator stream for the content, for instance, in which the elements are provided so as to enhance the viewing experience of one or more spectators of the stream.

The arrangement of FIG. 6 is an example of a processor (for example, a GPU and/or CPU located in a games console or any other computing device such as a server, or any suitable combination of such processing elements) that is operable to generate modified content, and in particular is operable to:

receive content comprising a virtual environment and one or more active elements;

receive inputs from one or more users;

generate one or more virtual elements within the virtual environment in response to the received inputs, the virtual elements being unable to be interacted with by the one or more active elements; and generate modified content comprising the virtual environment, the one or more active elements, and the one or more generated virtual elements.

Figure 7:
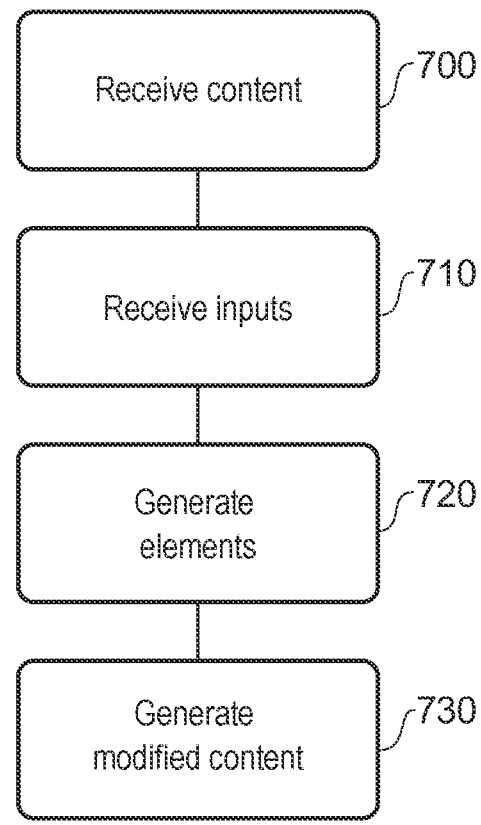
FIG. 7 schematically illustrates a content modification method.

FIG. 7 schematically illustrates a content modification method in accordance with a number of the embodiments described above.

A step 700 comprises receiving content comprising a virtual environment and one or more active elements.

A step 710 comprises receiving inputs from one or more users.

A step 720 comprises generating one or more virtual elements within the virtual environment in response to the received inputs, the virtual elements being unable to be interacted with by the one or more active elements; and A step 730 comprises generating modified content comprising the virtual environment, the one or more active elements, and the one or more generated virtual elements.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A content modification system comprising:
   a content receiving unit operable to receive content comprising a virtual environment and one or more active elements;
   an input receiving unit operable to receive inputs from one or more users;
   an element addition unit operable to generate one or more virtual elements within the virtual environment in response to the received inputs, the virtual elements being unable to be interacted with by the one or more active elements; and
   a content generation unit operable to generate modified content comprising the virtual environment, the one or more active elements, and the one or more generated virtual elements.

2. A system according to clause 1, wherein the virtual environment is a video game environment.

3. A system according to any preceding clause, wherein the input receiving unit is operable to receive inputs in the form of one or more of button presses, captured audio, gestures, and gaze tracking.

4. A system according to any preceding clause, wherein the element addition unit is operable to select a location of each element in dependence upon the received inputs.

5. A system according to any preceding clause, wherein the element addition unit is operable to select a format of each element in dependence upon the received inputs.

6. A system according to any preceding clause, wherein the element addition unit is operable to select a visibility of each element in dependence upon the received inputs.

7. A system according to any preceding clause, wherein the element addition unit is operable to determine content associated with each element in dependence upon the received inputs.

8. A system according to any preceding clause, wherein the element addition unit is operable to generate elements enabling the identification of the user that provided the corresponding inputs.

9. A system according to any preceding clause, wherein the content is a video stream of the virtual environment.

10. A system according to any of clauses 1 to 8, wherein the content is an interactive model of the virtual environment.

11. A system according to any preceding clause, wherein the active elements are player-controlled elements, and the one or more users are non-player users.

12. A method for use with a content modification system, the method comprising:
   receiving content comprising a virtual environment and one or more active elements;
   receiving inputs from one or more users;
   generating one or more virtual elements within the virtual environment in response to the received inputs, the virtual elements being unable to be interacted with by the one or more active elements; and
   generating modified content comprising the virtual environment, the one or more active elements, and the one or more generated virtual elements.

13. Computer software which, when executed by a computer, causes the computer to carry out the method of clause 12.

14. A non-transitory machine-readable storage medium which stores computer software according to clause 13.

The invention claimed is:

1. A content modification system comprising:
   a content receiving unit operable to receive content comprising a virtual environment and one or more active elements;
   an input receiving unit operable to receive inputs from one or more users;
   an element addition unit operable to generate one or more virtual elements within the virtual environment in response to the received inputs, the virtual elements being unable to be interacted with by the one or more active elements; and
   a content generation unit operable to generate modified content comprising the virtual environment, the one or more active elements, and the one or more generated virtual elements,
   wherein the virtual elements are able to be interacted with by one or more spectators of content comprising the virtual environment,
   wherein the virtual elements comprise information about one or more aspects of the virtual environment, elements within the virtual environment, and/or events within the virtual environment, where such information is accessible via at least one of the one or more users and the one or more spectators interacting with the virtual elements, and
   wherein the active elements are player-controlled elements, and the one or more users are non-player users.

2. The system of claim 1, wherein the virtual environment is a video game environment.

3. The system of claim 1, wherein the input receiving unit is operable to receive inputs in the form of one or more of button presses, captured audio, gestures, and gaze tracking.

4. The system of claim 1, wherein the element addition unit is operable to select a location of each element in dependence upon the received inputs.

5. The system of claim 1, wherein the element addition unit is operable to select a format of each of the virtual elements in dependence upon the received inputs.

6. The system of claim 1, wherein the element addition unit is operable to select a visibility of each of the virtual elements in dependence upon the received inputs.

7. The system of claim 1, wherein the element addition unit is operable to determine content associated with each of the virtual elements in dependence upon the received inputs.

8. The system of claim 1, wherein the element addition unit is operable to generate elements enabling the identification of the user that provided the corresponding inputs.

9. The system of claim 1, wherein the content is a video stream of the virtual environment.

10. The system of claim 1, wherein the content is an interactive model of the virtual environment.

11. A method for use with a content modification system, the method comprising:
receiving content comprising a virtual environment and one or more active elements;
receiving inputs from one or more users;
generating one or more virtual elements within the virtual environment in response to the received inputs, the virtual elements being unable to be interacted with by the one or more active elements; and
generating modified content comprising the virtual environment, the one or more active elements, and the one or more generated virtual elements,
wherein the virtual elements are able to be interacted with by one or more spectators of content comprising the virtual environment,
wherein the virtual elements comprise information about one or more aspects of the virtual environment, elements within the virtual environment, and/or events within the virtual environment, where such information is accessible via at least one of the one or more users and the one or more spectators interacting with the virtual elements, and
wherein the active elements are player-controlled elements, and the one or more users are non-player users.

12. A non-transitory machine-readable storage medium which stores computer software which, when executed by a computer, causes the computer to perform a method for use with a content modification system, the method comprising:
receiving content comprising a virtual environment and one or more active elements;
receiving inputs from one or more users;
generating one or more virtual elements within the virtual environment in response to the received inputs, the virtual elements being unable to be interacted with by the one or more active elements; and
generating modified content comprising the virtual environment, the one or more active elements, and the one or more generated virtual elements,
wherein the virtual elements are able to be interacted with by one or more spectators of content comprising the virtual environment,
wherein the virtual elements comprise information about one or more aspects of the virtual environment, elements within the virtual environment, and/or events within the virtual environment, where such information is accessible via at least one of the one or more users and the one or more spectators interacting with the virtual elements, and
wherein the active elements are player-controlled elements, and the one or more users are non-player users.

13. The system of claim 1, wherein at least one of the virtual elements has a fixed location with respect to the virtual environment, one or more of the active elements within the virtual environment, or an object within the virtual environment.

* * * * *